(12) United States Patent
Sokolov et al.

(10) Patent No.: US 11,068,876 B2
(45) Date of Patent: Jul. 20, 2021

(54) SECURING OF INTERNET OF THINGS DEVICES BASED ON MONITORING OF INFORMATION CONCERNING DEVICE PURCHASES

(71) Applicant: Symantec Corporation, Mountain View, CA (US)

(72) Inventors: Ilya Sokolov, Boston, MA (US); Bruce McCorkendale, Manhattan Beach, CA (US); Keith Newstadt, West Newton, MA (US)

(73) Assignee: Norton LifeLock, Tempe, AZ (US)

(*) Notice: Subject to any disclaimer, the term of this patent is extended or adjusted under 35 U.S.C. 154(b) by 113 days.

(21) Appl. No.: 15/942,232

(22) Filed: Mar. 30, 2018

(65) Prior Publication Data
US 2019/0303908 A1 Oct. 3, 2019

(51) Int. Cl.
*G06Q 20/32* (2012.01)
*G06N 5/04* (2006.01)

(52) U.S. Cl.
CPC ............ *G06Q 20/325* (2013.01); *G06N 5/04* (2013.01)

(58) Field of Classification Search
CPC ............ G06F 11/3055; G06F 11/0709; G06F 11/0751; G06F 11/079; G06F 11/1453;
(Continued)

(56) References Cited

U.S. PATENT DOCUMENTS

2015/0304862 A1* 10/2015 Nagaraja ............... H04W 24/02
455/418
2016/0377334 A1* 12/2016 Han .................... G01M 99/008
702/185
2016/0381030 A1* 12/2016 Chillappa ............... H04W 4/70
726/11
2017/0076168 A1* 3/2017 Vrabete .............. G06K 9/00624
(Continued)

OTHER PUBLICATIONS

Duffy, Jill, "The Best Apps for Tracking Your Online Purchases and Deliveries," PC Mag, Apr. 11, 2016, 4 pages. Retrieved from the Internet <https://www.pcmag.com/article/343584/how-to-track-your-packages-and-purchases>.
(Continued)

*Primary Examiner* — Alexander G Kalinowski
*Assistant Examiner* — Sanjeev Malhotra
(74) *Attorney, Agent, or Firm* — Brill Law Office; Jeffrey Brill

(57) ABSTRACT

Purchasing related activity that is executed on computing devices on a LAN is monitored. Information is identified concerning purchases of IoT devices on the LAN, based on the monitoring of the purchasing related activity. For example, a specific purchase of a specific device (or specific device type) can be identified, or identifying information concerning a purchased device can be inferred, based on monitored purchasing related activity. IoT devices are discovered on the LAN and identified. Identifying a discovered device can further comprise interrogating the discovered device, monitoring activities of the discovered device, and/or analyzing information concerning purchases of IoT devices on the LAN. Gleaned identifying information concerning a discovered device can be used to determine or disambiguate the device's identity. Identifying information concerning discovered devices can be transmitted to a backend component, which provides constraint profiles concerning discovered devices, which can be enforced on the LAN.

20 Claims, 3 Drawing Sheets

(58) Field of Classification Search
CPC ............. G06F 11/3006; G06F 11/3034; G06F 11/3409; G06F 12/023; G06F 12/0284; G06F 12/0692; G06F 13/1652; G06F 15/80; G06F 16/1744; G06F 21/57; G06F 21/6218; G06F 21/73; G06F 21/76; G06F 2212/401; G06F 2212/402; G06F 2221/2107; G06F 3/0604; G06F 3/0608; G06F 3/0611; G06F 3/0613; G06F 3/0617; G06F 3/0641; G06F 3/0647; G06F 3/065; G06F 3/0653; G06F 3/067; G06F 7/06; G06F 8/65; G06F 8/654; G06F 8/656; G06F 8/658; G06F 9/3851; G06F 9/3891; G06F 9/4401; G06F 9/4881; G06F 9/5038; G06F 9/505; G06F 9/544; H04L 41/0853; H04L 63/1425; H04L 12/2881; H04L 12/4633; H04L 41/044; H04L 41/046; H04L 41/0816; H04L 41/0896; H04L 41/12; H04L 41/142; H04L 43/04; H04L 43/06; H04L 43/08; H04L 43/0894; H04L 47/20; H04L 47/2441; H04L 47/78; H04L 49/104; H04L 61/2007; H04L 67/10; H04L 67/1014; H04L 67/327; H04L 67/36; H04L 9/0822; G06T 1/20; G06T 1/60; G06T 9/005; H01R 13/4538; H01R 13/631; H03K 19/1731; H03M 7/3084; H03M 7/40; H03M 7/42; H03M 7/60; H03M 7/6011; H03M 7/6017; H03M 7/6029; H05K 7/1452; H05K 7/1487
USPC ................ 702/185; 726/11; 455/418; 705/39
See application file for complete search history.

(56) References Cited

U.S. PATENT DOCUMENTS

| | | | |
|---|---|---|---|
| 2017/0079482 A1* | 3/2017 | Tsibulevskiy | E03C 1/0408 |
| 2017/0086132 A1* | 3/2017 | Singh | H04W 36/00835 |
| 2017/0124894 A1* | 5/2017 | Essafi | G06Q 10/00 |
| 2017/0273107 A1* | 9/2017 | Khoshnevisan | H04W 74/085 |
| 2018/0025356 A1* | 1/2018 | Maheshwari | G06Q 20/3226 705/39 |
| 2018/0124072 A1* | 5/2018 | Hamdi | G06F 11/3055 |
| 2018/0152383 A1* | 5/2018 | Burres | H03M 7/6017 |
| 2018/0152540 A1* | 5/2018 | Niell | G06F 12/0692 |
| 2018/0268003 A1* | 9/2018 | Barsness | G06F 16/21 |
| 2018/0268031 A1* | 9/2018 | Barsness | G06F 16/21 |
| 2019/0044829 A1* | 2/2019 | Balzer | G06N 20/00 |
| 2019/0064929 A1* | 2/2019 | Tomeh | H04L 12/2803 |
| 2019/0114693 A1* | 4/2019 | Zhang | G06Q 30/0637 |
| 2019/0319808 A1* | 10/2019 | Fallah | H04L 9/30 |

OTHER PUBLICATIONS

Samsung UN40H5003-40-Inch Full 1080p HD 60 Hz LED TV + Hookup Kit—Includes TV, HDMI to HDMI Cable 6', 6 Outlet Wall Tap Surge Protector Dual 2.1A USB Ports Cleaning Kit, Amazon. com, Retrieved from the Internet on Oct. 10, 2018, 1 page. <https://www.amazon.com/Samsung-UN40H5003-40-Inch-Protector-Cleaning/dp/B00YMEU2TY/ref=sr_1_2_sspa?s=tv&ie=UTF8&qid=1508619761&sr=1-2-spons&keywords=Samsung+smart+TV&psc=1>.

Fire HD 8 Kids Edition Tablet, 8" HD Display, 32 GB, Blue Kid-Proof Case (Previous Generation—7th), Amazon.com, Retrieved from the Internet on Oct. 10, 2018, <https://www.amazon.com/All-New-Amazon-Fire-HD-8-Kids-Edition-Tablet/dp/B01J94SBEY/ref=sr_1_3?s=electronics&ie=UTF8&qid=1508620505&sr=1-3&keywords=amazon+kids+fire+tablet>.

* cited by examiner

SECURING OF INTERNET OF THINGS DEVICES BASED ON MONITORING OF INFORMATION CONCERNING DEVICE PURCHASES

TECHNICAL FIELD

This disclosure pertains generally to computer security, and more specifically to, securing of Internet of Things devices on local area networks.

BACKGROUND

The Internet of Things (IoT) refers to a network of physical objects or "things" equipped with computing hardware and software, including the ability to connect to a network and run computer instructions. Household items such as smart thermostats, bulbs, locks, and refrigerators, smart entertainment systems such as TVs and content streaming devices, home voice-activated assistants, as well as sensor-equipped wearable devices, are some examples of currently popular IoT devices. New IoT devices are rapidly becoming available and adopted by household users.

IoT devices are in fact networked computing devices, albeit in some cases with relatively low amounts storage, memory, power supply and processing capability, and in some instances with no display. Another key characteristic that many of these connected IoT devices share is low security. As networked computing devices, IoT devices are vulnerable to malware, network attacks, data theft and the other security threats to which other networked computers are subject.

As such, these devices create a number of different potential vulnerabilities. The devices themselves may be subject to compromise, or their behaviors could compromise other systems on the same network. IoT devices often have corresponding cloud services, on which they store information about their customers and the data that they gather. These cloud services can also be insecure. The combination of IoT device vulnerabilities, associated cloud service vulnerabilities, and IoT devices potentially compromising the data they handle and the network on which they are installed is very real and very serious.

Smart homes are becoming more prominent, in which multiple IoT devices are combined in a home network. In this context, devices may identify and communicate with counterparts to solve particular user problems (e.g., order groceries online when a smart refrigerator is running low on specific items, automatically turn off the lights, lower the heat and lock the doors when people leave the premises, etc.). As new IoT devices are frequently added into such a network ecosystem, new vulnerabilities and threats are also introduced. As such, it is desirable to accurately and quickly identify new devices as they are added to the home network, in order to generate a signature for the IoT device, and to create or apply a corresponding constraint profile.

Network IoT device constraint profiles may be set manually by the home owner/administrator. However, this requires significant networking and computer security knowledge, and is typically beyond the skill set of the general public in the context of a smart home environment.

A security component running on a computing device in a smart home environment may use conventional networking analysis to attempt to automatically recognize IoT device devices, and identify or set corresponding constraint profiles. Unfortunately, in many instances such conventional analysis is neither fast nor accurate enough to identify newly added devices and robustly protect the home network. Although the identity of some IoT devices is readily discernable, that of many others is not. In some cases, it cannot be conventionally determined whether a newly added device is, e.g., a smart lighting system, refrigerator or washing machine. In some cases, only incomplete information can be gleaned concerning a newly added device through conventional analysis. For example, it may be possible to determine that a newly added device is a given make of smart TV, from its MAC address or the like, without being able to learn the specific model. As such, an incorrect constraint profile may be set for the device, resulting in security vulnerabilities. For example, conventional analysis may determine that a newly added device is an Android device, but not whether it is, for example, a user's Android phone or a Smart TV running Android (or, for that matter, a rogue device behaving like an Android device). However, different constraint profiles/access policies should be applied in each case. For example, the smart TV likely should not be allowed to communicate with the smart thermostat or locks directly, whereas an Android phone likely would, and the rouge device should not be allowed to access the network at all.

It would be desirable to address these issues.

SUMMARY

A network appliance such a router secures internet of things (IoT) devices on a local area network. Purchasing related activity that is executed on computing devices (e.g., desktop and laptop computers, smartphones, etc.) on the local area network is monitored. This monitoring can take different forms, such as monitoring activity indicative of purchases of IoT devices (e.g., detecting an order confirmation), monitoring activity indicative of user interest in purchasing IoT devices (e.g., reading online reviews, visiting shopping sites, etc.), detecting a search for keywords or phrases concerning IoT devices, detecting IoT device related questions, conversations and/or purchase confirmations in electronic user communication, monitoring a microphone of an existing IoT device on the local area network (e.g., a smart speaker or smart phone), etc. In some embodiments, monitoring of purchasing activity occurs outside of the local area network in addition (or instead), for example on a backend component in the cloud. In addition, analytics can be used to determine local area network level demographic trends and/or user level demographic trends concerning purchasing of IoT devices, based on monitored purchasing related activity.

Information is identified concerning purchases of IoT devices on the local area network, based on the monitoring of the purchasing related activity. For example, a specific purchase of a specific IoT device (or specific type of IoT device) can be identified, or identifying information (e.g., the type, make, model, etc.) concerning a purchased IoT device can be inferred based on monitored purchasing related activity. The degree of certainty concerning an identified purchase can also be weighted based on monitored purchasing related activity.

IoT devices are discovered on the local area network, for example as new devices are added, and discovered IoT devices are identified. Identifying a discovered IoT device can further comprise interrogating the discovered IoT device, monitoring activities of the discovered IoT device, and/or analyzing information concerning purchases of IoT devices on the local area network. For example, gleaned identifying information concerning a discovered IoT device can be used to determine or disambiguate the device's identity.

Identifying information concerning discovered IoT devices can be transmitted to a remote backend component, for example on a cloud based server, as can monitored purchasing related activity executed on computing devices on the local area network. The local area network (e.g., the router) can receive constraint profiles concerning discovered IoT devices from the remote backend component, and enforce the received constraint profiles on the local area network. In addition, the local area network can periodically receive updated constraint profiles concerning specific IoT devices from the remote backend component, and enforce the updated profiles.

The backend server computer can secure IoT devices on a plurality of local area networks. The backend server computer receives, from the multiple local area networks (e.g., from the routers), information concerning monitored activities of multiple IoT devices, and information concerning monitored purchasing related activity. The backend server can amalgamate the information received from the multiple local area networks over time. For each specific IoT device for which information concerning monitored activities is received, the backend server can determine activities the specific IoT device performs in order to execute authorized functionality, based on at least amalgamated information concerning monitored activities of the specific IoT device and amalgamated information concerning monitored purchasing related activity. The backend server can create a constraint profile for each specific IoT device for which information concerning monitored activities is received, based on at least corresponding determined activities, wherein each constraint profile comprises local area network level directives specifying how to enable the corresponding IoT device to execute authorized functionality while maintaining local area network level security. The backend server can then transmit created constraint profiles to the local area networks.

The backend server computer can maintain a database of records concerning known IoT devices, each record comprising at least a constraint profile. In response to receiving identifying information concerning a specific IoT device discovered on a specific local area network, the backend server can determine whether a record concerning the specific discovered IoT device is present in the database, and if so transmit a corresponding constraint profile to the local area network.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
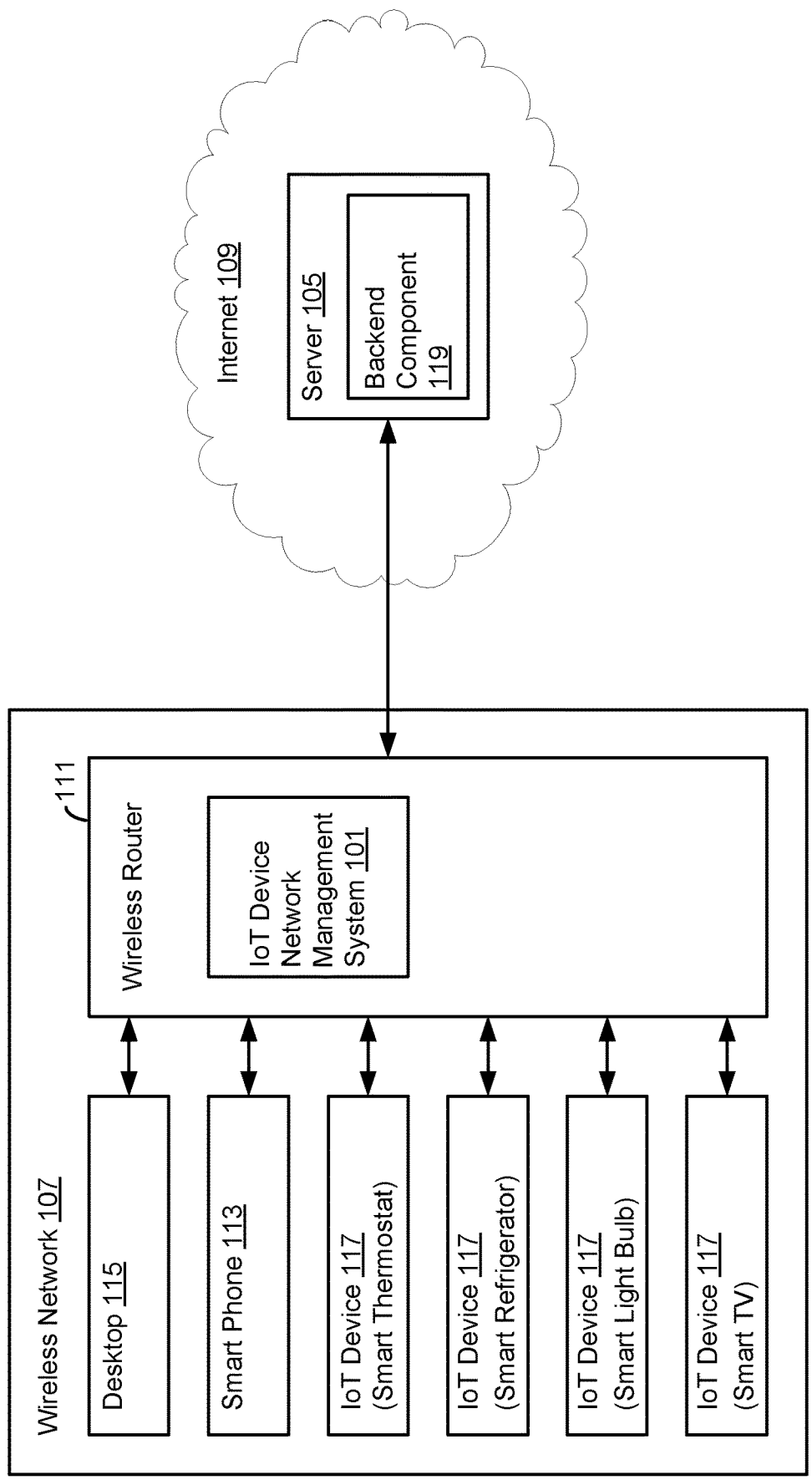
FIG. 1 is a block diagram of an exemplary network architecture in which an IoT device network management system can be implemented, according to some embodiments.

FIG. 1 is a block diagram illustrating an exemplary network architecture in which an IoT device network management system 101 can be implemented. The illustrated network architecture comprises a local area network 107 (for example in a home, school, coffee shop or other context). The illustrated local area network 107 ("LAN") comprises multiple computers 210 which are connected to a router 111, which is in turn connected the internet 109 (or in other embodiments to a different wide area network). The computers 210 present in a local area network 107 can comprise any combination of desktop computers 115, mobile computing devices 113 and or IoT devices 123, acting in the capacity of clients 103 and/or servers 105 as desired. A mobile computing device 113 can comprise any type of portable computer system capable of connecting to a network 107 and running computer instructions. Smartphones, tablet computers, laptop computers, hybrids, convertible laptops, smart watches, smart bracelets, other types of wearable computing devices, smart stickers and smart tiles are all examples of mobile computing devices 113. An IoT device 123 can comprise any type of physical object containing a computing infrastructure capable of running computer instructions, connecting to a network 107 and automatically transferring data to other computing devices without requiring human-to-human or human-to-computer interaction. Some example types of IoT device 123 are smart thermostats, washing machines, dryers, refrigerators, light bulbs, electric sockets/plugs, and other appliances that use sensors to monitor conditions, positions, contents and/or other criteria, and responsively execute computer instructions to control their associated hardware (e.g., adjust temperature, speed, water flow, lighting, etc.), and/or transmit data to other computing devices over the network 107. IoT devices 123 that facilitate entertainment services are another type of IoT device 123 (examples include smart internet connected TVs, video and/or audio streaming devices, blue ray players, etc). Another example of a type of IoT device are those embedded within or worn by people or animals that perform automatic sensing, hardware control and/or data exchange functions (e.g., a pacemaker monitor and control implant, a transponder embedded in a pet or farm animal, a bracelet that monitors a person's heart rate, blood pressure, sleep hygiene, movements, etc.). Yet another example type is sensors/control units built into automobiles or other vehicles. A conventional general purpose computer such as a desktop, workstation, laptop, tablet or smart phone is typically not considered an IoT device 123. However, some contemporary mobile computing devices 113 can also be considered IoT devices 123, such as smart stickers, smart tiles, smart bracelets and other types of attachable/affixable/wearable computing devices.

In FIG. 1, the wireless local area network 107 comprises a router 111, a desktop computer 115, one mobile computing device (a smartphone) 113, and four IoT devices 123 (a smart thermostat, a smart refrigerator, a smart light bulb, and a smart TV). Although in this context these devices are typically connected to the router 111 wirelessly, it is also possible for computing devices 210 in the local area network 107 to be physically coupled to the router 111, via, e.g., Ethernet. The router 111 is in turn communicatively coupled to the internet 109 via cable, DSL through an ISP, optical fiber, etc. In practice, more or fewer computing devices 210 can be included in a local area network 107 as desired, and devices can be added to and removed from the network 107 over time, as well as come in and out of wireless range.

In FIG. 1, the IoT device network management system 101 is illustrated as residing on a wireless router 111, and a corresponding backend component 119 is illustrated as residing on a server 105 on the internet 109. It is to be understood that these are just examples, and in different embodiments various functionalities and/or components of the IoT device network management system 101 can be instantiated on other types of computers 210 and/or programmable network appliances, and can be otherwise distributed between multiple computing devices as desired. Furthermore, a wireless router 111 is just an example of a centralized device on which the local network based functionality of the IoT device network management system 101 can be instantiated. In other embodiments, such functionality can be implemented on other devices within the local area network 107, such as a network sniffer, switch, desktop computer 115, etc.

Figure 2:
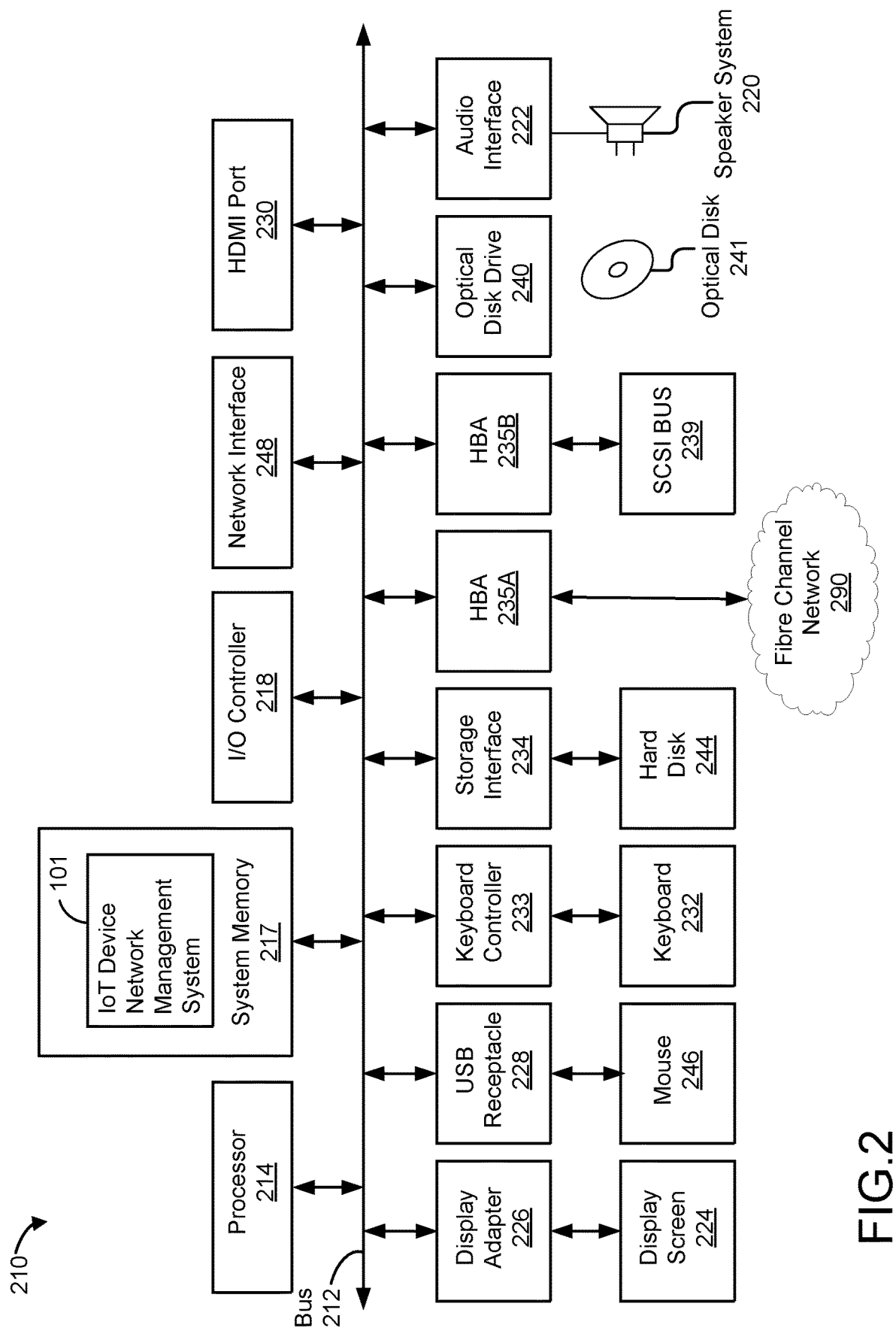
FIG. 2 is a block diagram of a computer system suitable for implementing an IoT device network management system, according to some embodiments.

FIG. 2 is a block diagram of a computer system 210 suitable for implementing an IoT device network management system 101. Both desktops 115 and mobile computing devices 113 can be implemented in the form of such computer systems 210. Programmable network appliances and IoT devices 123 can also be implemented in the form of such computer systems 210, although typically lacking many of the illustrated components, such as optical disk drives 240, keyboards 242, pointing devices 246 and display screens 224.

As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, HDMI ports 230, etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 241, a mouse 246 (or other pointing device) coupled to the bus 212, e.g., via a USB receptacle 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 113 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the IoT device network management system 101 is illustrated as residing in system memory 217. The workings of the IoT device network management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as a local area network 107 or the internet 109. Mobile computing devices 113 can typically connect to wireless networks using the IEEE 802.11 standards (WiFi), and often have adapters for additional wireless communication protocols such as LTE, BlueTooth, NFC, etc. Smartphones are also typically equipped for voice communication over cellular networks.

Figure 3:
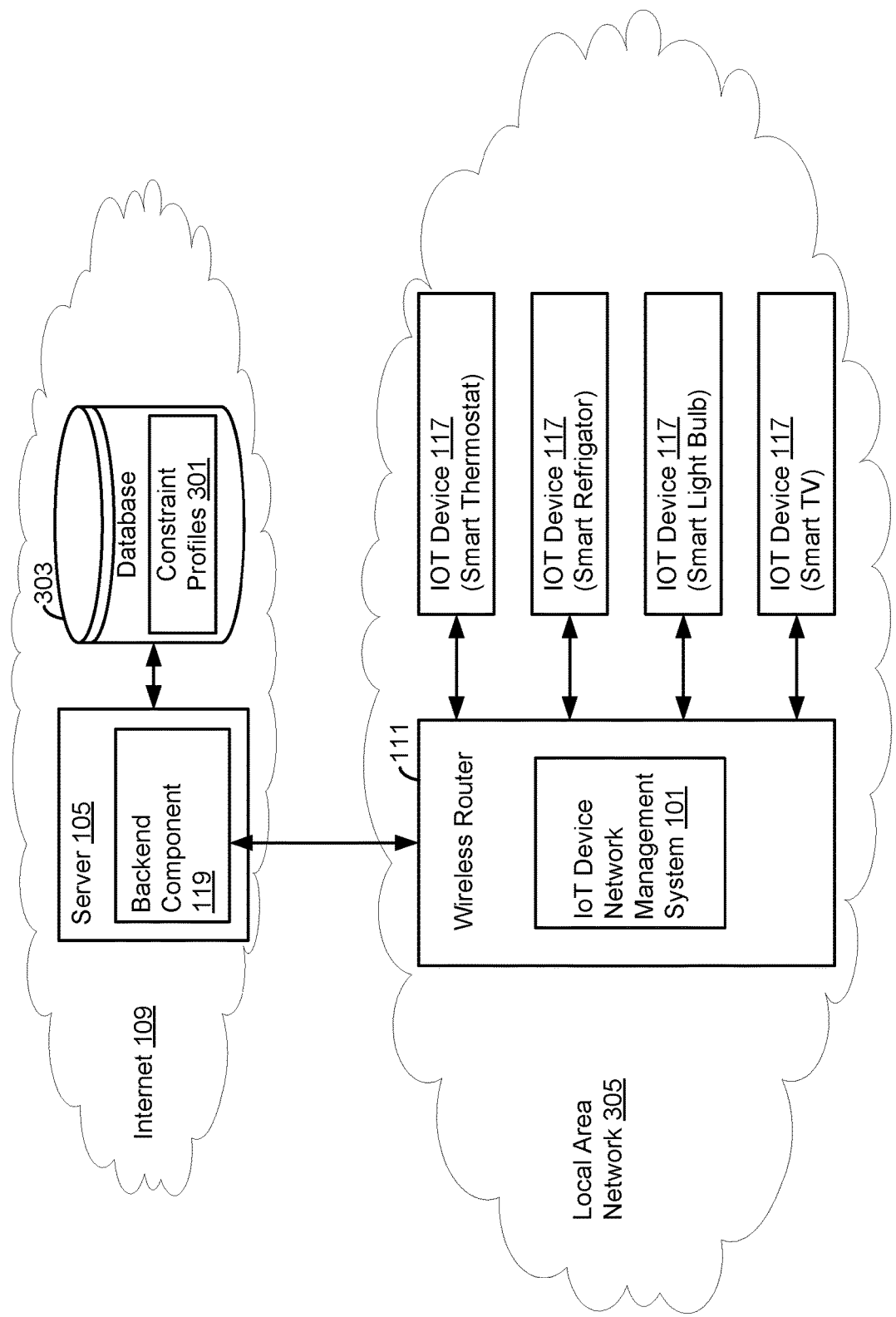
FIG. 3 is a block diagram of the operation of an IoT device network management system, according to some embodiments.

FIG. 3 illustrates the IoT device network management system 101 running on the router 111 of a wireless local area network, with a backend component 119 running on an internet server 105 (i.e., in the cloud). The router level functionality of the IoT device network management system 101 can be instantiated as an application running on a hardware router 111 with a configurable software component. One possible example is DD-WRT aftermarket open source routing firmware (not illustrated), which can run on top of a hardware router 111, and be configured to provide the described functionality. In other embodiments, other implementations are used to build a configurable layer of functionality that runs in conjunction with the hardware and/or software level routing components.

Routers 111 tend to be powered on 24/7, making a router 111 a suitable location for certain functions performed by the IoT device network management system 101. In other embodiments the router level functionality of the IoT device network management system 101 is located on other components, such as a different programmable network appliance (e.g., a sniffer) or a desktop computer 115 that is communicatively coupled to the router 111. In addition, as described in more detail below, a backend component 119 may run in the cloud (e.g., on one or more internet servers 105), and communicate with IoT device network management systems 101 running on the routers 111 of multiple local area networks 107.

As noted above, the functionalities of the of the IoT device network management system 101 and backend component 119 can be implemented on other computing devices, or can be distributed between multiple computer systems 210, including within a cloud-based computing environment in which the functionality of the IoT device network management system 101 is provided as a service over a network 107. It is to be understood that although the IoT device network management systems 101 and backend component 119 are illustrated in FIG. 3 as standalone entities, each component of the IoT device network management system 101 represents a collection of functionalities, which can be instantiated as a single or as multiple modules on one or more computing devices 210 as desired. FIG. 3 illustrates a specific embodiment in which the IoT device network management system 101 is instantiated in the form of specific, multiple modules which are located on routers 111 and a backend server 105. In other embodiments, the functionalities of the IoT device network management system 101 are distributed and/or instantiated in other ways.

The modules of the IoT device network management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the IoT device network management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In addition to the IoT device network management system 101 functionality described below, each router 111 also typically supports a conventional local area network 107, to which conventional computing devices 210 can connect, using whatever conventional protocols the router 111 provides. Computing devices 210 can thus access the local area network and/or internet according to the administered configuration. In some embodiments, routers 111 contain wireless transceivers (not illustrated) for communicating to IoT devices 123 using protocols such as Z-Wave, Zigbee, Bluetooth Low Energy, 6lowpan, etc. Under some such protocols, IoT devices 123 use a mesh network to communicate with one another and a hub that communicates with all of them and presents them to the network 107 as IP devices (the hub translates between IP and these other protocols). In some embodiments, the router 111 acts as such a hub. In some embodiments, the router 111 communicates with other such hubs as well (or instead). In addition, the IoT device network management system 101 itself can use the connectivity provided by the router 111 to communicate with components outside of the local area network 107, such as the backend component 119 on the internet 109.

Referring now to FIG. 3, an activity monitoring module 305 of the IoT device network management system 101 monitors device purchasing related activity conducted on or in conjunction with the local area network 107 (e.g., activity conducted by users of computing devices 210 on the local area network 107). The activity monitored in this context can be in the form of actual purchases of IoT devices 123 (e.g., online orders and the like), as well as activity indicative of user interest in potentially purchasing given IoT devices 123 or types thereof (e.g., online research or other activity concerning a given IoT device 123 or type thereof).

In different embodiments, different functionalities can be utilized to monitor this activity. For example, browser activity can be monitored, via, e.g., a browser toolbar, plugin or the like, in order to detect user searches for relevant keywords and phrases concerning given types of IoT devices 123 or specific models thereof. In addition, such browser based tools can be used to detect user presence on online shopping sites, including specific pages offering (or, e.g., reviewing) IoT devices 123. Email activity (or other forms of electronic communication such as texts) may be monitored to detect queries and conversations concerning given IoT devices 123 and types thereof, as well as order confirmations. Such email monitoring can be performed for example by using a plugin to the mail client. Likewise, an authorization framework such as OpenID Connect, OAuth or SAML may be used for monitoring a cloud based mail box (e.g., Gmail, Hotmail, etc.) or other cloud services (e.g., online store purchase history) for order confirmations and other activity indicative of IoT device 123 research and/or purchasing activity. Monitoring the microphone of existing IoT devices 123 on the local area network 107 (e.g., smart speaker devices, phones, etc.) can also determine when users make or discuss purchases of interest. Physical proximity of the user's phone to specific IoT devices 123 indicative of a purchase in an automated store (e.g., the Amazon Go store) can also be detected, e.g., via a Bluetooth beacon or the like. These are just examples of specific implementations of monitoring purchase and research activity concerning IoT devices 123. In other embodiments, additional and/or different techniques may be used. It is to be understood that the level at which the activity monitoring module 305 monitors such activity conducted by computing devices 210 on the local area network 107 would typically vary based on the level of access permission provided to the IoT device network management system 101 by the user(s) of computing devices 210 on the local area network 107.

Based on the above described monitoring activity, a purchase identifying module 307 of the IoT device network management system 101 identifies information concerning purchases of specific IoT devices 123 by users on the local area network 107. In some instances, purchases of specific models of IoT devices 123 can be positively identified, for example where it has been gleaned by the monitoring that a user has purchased a specific make and model of smart thermostat. In some cases, even the delivery date (or a range of possible days) can be determined, for example where the monitoring activity confirms a purchase and the corresponding shipping option chosen (overnight, two day delivery, standard USPS, etc.). In other scenarios, the purchase identifying module 307 may identify that the user has made a purchase, without having information to confirm with certainty the exact item that was purchased. In this scenario, the purchase identifying module 307 may infer the type of IoT device 123 that was purchased based on the monitoring activity. For example, where the user that made the purchase had been researching different models of smart TVs online prior to the purchase, the purchase identifying module 307 could infer that a smart TV has been purchased. In general, the degree of certainty concerning identified purchases of IoT devices 123 can vary, and the identifications can be automatically weighted accordingly. It is to be understood that the specific statistical model(s) and/or artificial intelligence algorithm(s) used by the purchase identifying module 307 to infer possible purchasing activity of specific IoT devices 123 or device types based on the monitoring activity can vary between embodiments, as can the specific methodology used for automatically weighting confidence levels.

A device discovering module 309 of the IoT device network management system 101 discovers IoT devices 123 on the local area network 107. Every time a new IoT device 123 is added to the local area network 107, the device discovering module 309 gleans identifying information concerning the new device 123. This can take the form of interrogating the device 123, or monitoring the communication or other activities of the device 123, and gleaning relevant device information from various protocols such as Address Resolution Protocol (ARP), Dynamic Host Configuration Protocol (DHCP), Universal Plug and Play (UPnP), Hypertext Transfer Protocol (HTTP), etc. This gleaned identifying information concerning the device 123 is used in the process of identifying the specific IoT device 123, and matching it to a corresponding constraint profile 301, as described in more detail below.

As noted above, correctly discovering the identity of IoT devices 123 added to a local area network 107 is non-trivial. Although the identity of some IoT devices 123 can be discovered with a requisite degree of certainty though device interrogation or profile/communication monitoring or the like when the device 123 is added to the local area network 107, for many IoT devices 123 this is not the case. In this context, information concerning identified purchases of IoT devices 123 (including both confirmed purchases and possible purchases identified at various level of confidence and granularity) are provided as input to the device discovering module 309, and used to improve the discovery process. In other words, the device discovering module 309 analyzes information concerning purchases of IoT devices 123 in its gleaning of identification information concerning discovered IoT devices 123, and to aid in the disambiguation of uncertainty concerning discoveries.

For example, an Apple watch and an iPhone may be conventionally indistinguishable when detected by the router 111, although these are very different devices that should be managed differently on the local area network 107. However, in an example scenario in which it has been identified that the user has definitely or potentially purchased an Apple watch (e.g., by identifying an actual purchase, or determining that the user has recently been visiting researching/shopping for Apple watches, or smart watches generally), this information can enable the device discovering module 309 to determine that an Apple watch has been added to the local area network 107. The appropriate constraint profile 301 for an Apple watch can then be applied as described in more detail below.

It is to be understood that this is just an example of using information concerning device purchases to identify IoT devices 123. As another example, suppose it has been detected that a new IoT device 123 has been added to the local area network 107, but no specific information narrowing down identity of the device 123 is known. However, the purchase identifying module 307 has identified that a corresponding user has been conducted extensive research on different brands of smart refrigerators. Based on this information, the device discovering module 309 can conclude that the purchased device 123 is a smart refrigerator of an unknown make and model.

In general, the identified purchase information can be input into the discovery algorithm(s) applied by the device discovering module 309, thereby increasing both the efficiency and accuracy of the discovery of IoT devices 123 on the local area network 107. In other words, identification of IoT devices 123 using factors such as handshaking and traffic analysis can be supplemented and improved using information concerning identified purchases of IoT devices 123. The amount of weight to be given to information concerning identified purchases in the identification of IoT devices 123 can vary based on the certainty of the identifications themselves (e.g., positive identification of a purchase versus identification of a possible purchase at various levels of certainty, and/or identification of specific IoT device 123 versus device type, etc.), as well as the nature, configuration and tuning of the discovery algorithm(s) in use (e.g., the amount of weight to assign to purchase identification versus, e.g., traffic patterns is a variable design parameter, and can be adjusted as desired). It is to be understood further that the specific device identification algorithm(s)/methodologies into which the information concerning IoT device 123 purchase activity is input is also a variable design parameter. Additionally, in some embodiments, the device discovering module 309 can further query the user (e.g., via a GUI or the like) to glean additional information to help confirm or narrow discoveries of IoT devices 123 (e.g., "A new device has been detected on the network and identified as an Apple watch. Please confirm whether this device is an Apple watch: Yes or No."

As described in more detail below, once an added IoT device 123 has been identified, a corresponding constraint profile 301 can be retrieved or created, depending upon whether a constraint profile 301 for the given IoT device 123 already exists. Constraint profiles 301 are geared towards allowing IoT devices 123 to perform expected, trusted operations in order to function as intended, while restricting the devices 123 from performing operations beyond this, as described in more detail below.

A constraint profile enforcing module 311 can enforce the constraint profiles 301, thereby automatically constraining the communications and behaviors allowed for different IoT devices 123, to minimize possible threats to or from the IoT devices 123 themselves, as well other computing devices, services and data on the local area networks 107. Identifying existing constraint profiles 301 for given IoT devices 123, as well as creating and enforcing constraint profiles for IoT devices, are described in detail in U.S. Pat. No. 9,565,192, titled "Router Based Securing of Internet of Things Devices on Local Area Networks" and having the same assignee (the "Constraint Profile Patent"). The Constraint Profile Patent is incorporated herein by reference.

In one embodiment, when the device discovering module 309 identifies an added IoT device 123, the identity of the device 123 is provided to the backend component 119 (e.g., on an internet server 105 as illustrated in FIG. 3). As described in the Constraint Profile Patent, the backend component 119 can maintain a database 303 (or other suitable storage mechanism) of records (or other suitable data structure) concerning known IoT devices 123, with corresponding constraint profiles 301. In response to receiving the identification of the IoT device 123, the backend component 119 determines whether there is a corresponding record concerning the device 123 in the database 303. If so, the backend component 119 transmits the associated constraint profile 301 to the IoT device network management system 101 on the router 111, which can enforce the constraint profile 301 for the device 123 as described in more detail below.

Where the IoT device 123 has not been previously identified, the backend component 119 can create a new database record based on received device information, and associate a default constraint profile 301 for an unknown device 123 with the new record. This default constraint profile 301 can then be provided to the IoT device network management system 101 on the router 111. In some embodiments, the IoT device network management system 101 on the router 111 maintains the default constraint profile 301 for unknown devices 123. In this scenario, the backend component 119 transmits an indication to the IoT device network management system 101 the device 123 is unknown, and to utilize the default unknown device profile 301.

More specifically, it is to be understood that the backend component 119 may receive information concerning identified purchases (and other relevant information, such as information concerning the observed behavior of various IoT devices 123 as described in the Constraint Profile Patent) from a large number of local area networks 107 on which IoT device network management systems 101 are deployed. The backend component 119 may receive information concerning the identification and behavior of various IoT devices 123 as they are installed and run on many different local area networks 107. The backend component 119 is therefore able to track the installations, communications and other behaviors of different IoT devices 123 on different local area networks 107 over time.

As described in detail in the Constraint Profile Patent, based on these factors, the backend component 119 can create new constraint profiles 301 governing the allowed communication and behaviors of the various previously unprofiled IoT devices 123. The backend component 119 then provides these new profiles 301 to the IoT device network management systems 101 on the various local area networks 107. The constraint profile enforcing module 311 of the IoT device network management system 101 enforces the constraint profiles 301 received for given IoT devices 123, thereby automatically constraining the communications and behaviors allowed for these different IoT devices 123.

In addition to the information that is provided to the backend component 119 as described in the Constraint Profile Patent, IoT device network management systems 101 deployed on a plurality of local area networks 107 can provide the backend component 119 with monitored information concerning purchasing and research related activity concerning IoT devices 123, as well as identified purchases at various levels of granularity. This crowdsourced purchase information can then be used as a factor in creating new constraint profiles 301 for IoT devices 123 that previously lacked profiles 301. For example, for an unknown IoT device 123 (or an IoT device 123 for which there is not yet a good/mature constraint profile 301), the backend component 119 may use purchase information concerning the device 123 received from many local area networks 107 (e.g., many purchases spread across many different households) as input for the building of a corresponding constraint profile 301.

In some embodiments, constraint profiles 301 can be more narrowly tailored to specific IoT devices 123, based on factors such as the target user of the device 123. The constraint profile enforcing module 311 can use the specifications in the constraint profile 301 to configure firewall, network topology and/or software settings for the device 123 to function both fully and safely. For example, if the identified device 123 is one known to be targeted to children (e.g., a Kindle Fire HD Kids Edition), a family parental policy associated with the given local area network 107 may be automatically applied. Such tailoring can be at any desired level of granularity. For example, the constraint profile enforcing module can put a given device 123 on a dedicated VLAN separate from the general local area network 107, with specific firewall rules that expressly limit its communications only to the appropriate known legitimate domains, ports, direction of communication or communication content.

Over time, the IoT device network management systems 101 deployed on the plurality of local area networks 107 across the user base can continue to provide information to the backend component 119 concerning the detection and monitoring of IoT devices 123, as described in the Constraint Profile Patent. In addition, the IoT device network management systems 101 can continue to provide monitored information to the backend component 119 concerning the detection, researching, purchasing and identification of IoT devices 123. The backend component 119 can amalgamate all of this information it receives from the IoT device network management systems 101 (and in some instances from other sources as well, such as IoT device 123 manufacturers). Based on observed behaviors across installs on multiple local area networks 107, as well as backend analysis of received information including information concerning purchasing of IoT devices 123, the backend component 119 can optimize communication constraint profiles 301 as an IoT device's behaviors, install base and reputation become better known. The backend component 119 can dynamically update constraint profiles 301 over time, and provide updated constraint profiles 310 to the IoT device network management systems 101.

In addition, in some embodiments analytics can be used to map information concerning from purchases of IoT devices 123 to local area network (e.g., household) and user level demographic trends. For example, identified user interest in or purchase of different IoT devices 123 may be associated with per user and/or per household anonymous identifiers. The specific IoT devices 123 purchased, researched and/or owned by given users/households can be correlated across multiple installations to identify patterns. For example, it could be learned from such analytics that, e.g., households with, e.g., an Amazon Echo, tend to purchase a certain make of, e.g., smart TV. Thus, for example, analytic analysis can be used to identify unknown IoT devices 123 added to a local area network 107, based on what other devices 123 are installed thereon and network/user level demographics. These analytics can be performed utilizing demographics concerning households/user(s) at any level of granularity to help identify IoT devices 123 on given local area networks 107. It is to be understood that the specific analytical methodologies, statistical model(s) and/or artificial intelligence algorithm(s) used to perform this functionality can vary between embodiments. In some embodiments, third party technologies such as Google Analytics can be used in this context.

This analytic analysis can be used in the identification of IoT devices 123 even on local area networks households that do not give the IoT device network management system 101 permission to monitor their purchasing activity. For example, even for users that do not authorize the above described monitoring of purchasing information, the IoT device network management system 101 could still identify new IoT devices 123 added to the local area network 107, based on its demographics, e.g., what other devices 123 are installed, the ages of the users, etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A method implemented on a network appliance on a local area network for securing internet of things (IoT) devices, the method comprising:
    monitoring purchasing related activity executed on at least one computing device on the local area network;
    identifying information concerning a purchase of at least one IoT device on at least one computing device on the local area network, using the monitored purchasing related activity;
    determining a level of confidence of an identity of at least one specific IoT device purchased on at least one computing device on the local area network, by assigning weight to identified information concerning the purchase of at least one IoT device;
    discovering an IoT device added to the local area network;
    analyzing the information concerning the purchase of at least one IoT device, including the level of confidence;
    determining identifying information concerning the discovered IoT device, using the analyzed information concerning the purchase of at least one IoT device, including the level of confidence;
    transmitting identifying information concerning the discovered IoT device to a remote backend component, the identifying information concerning the purchase of the discovered IoT device further comprising the level of confidence of the identity of the discovered IoT device;
    receiving a constraint profile matching the discovered IoT device from the remote backend component, the remote backend component configured to create the constraint profile using information concerning purchases of the discovered IoT device received from a plurality of other local area networks, the information concerning purchases of the discovered IoT device further comprising corresponding levels of confidence of the identity of the discovered IoT device; and
    constraining a behavior of the discovered IoT device to perform authorized functionality by enforcing the received constraint profile on the local area network.

2. The method of claim 1, wherein monitoring the purchasing related activity further comprises:
    monitoring activity indicative of the purchase of at least one IoT device.

3. The method of claim 1, wherein monitoring the purchasing related activity further comprises:
    monitoring activity indicative of user interest in purchasing at least one IoT device.

4. The method of claim 1, wherein monitoring the purchasing related activity further comprises:
    detecting a search for keywords or phrases concerning at least one IoT device.

5. The method of claim 1, wherein monitoring the purchasing related activity further comprises:
    detecting user interaction with at least one site offering at least one IoT device for sale or at least one site reviewing at least one IoT device.

6. The method of claim 1, wherein monitoring the purchasing related activity further comprises:
    detecting content concerning at least one IoT device in electronic user communication.

7. The method of claim 1, wherein monitoring the purchasing related activity further comprises:
    detecting confirmation of the purchase of at least one IoT device in electronic user communication.

8. The method of claim 1, wherein monitoring the purchasing related activity further comprises:
    monitoring a microphone of at least one existing IoT device on the local area network.

9. The method of claim 1, wherein identifying information concerning the purchase of at least one IoT device on at least one computing device on the local area network using the monitored purchasing related activity, further comprises:
    positively identifying a specific purchase of a specific IoT device.

10. The method of claim 1, wherein identifying information concerning the purchase of at least one IoT device on at least one computing device on the local area network using the monitored purchasing related activity, further comprises:
    identifying a purchase of an IoT device; and
    inferring identifying information concerning the purchased IoT device, using the monitored purchasing related activity.

11. The method of claim 1, wherein identifying information concerning the purchase of at least one IoT device on at least one computing device on the local area network using the monitored purchasing related activity, further comprises:
    identifying a purchase of an IoT device; and
    weighting a degree of certainty concerning the identified purchase using the monitored purchasing related activity.

12. The method of claim 1, wherein determining the identifying information concerning the discovered IoT device further comprises:
    interrogating the discovered IoT device.

13. The method of claim 1, wherein determining the identifying information concerning the discovered IoT device further comprises:
    monitoring activities of the discovered IoT device; and
    determining the identifying information concerning the discovered IoT device from the monitored activities.

14. The method of claim 1, further comprising:
    using the identifying information concerning the discovered IoT device to disambiguate an identity of the discovered IoT device.

15. The method of claim 1, further comprising:
    transmitting monitored purchasing related activity executed on the at least one computing device on the local area network to the remote backend component, wherein the remote backend component receives monitored purchasing related activity from multiple local area networks;
    periodically receiving updated constraint profiles concerning specific IoT devices from the remote backend component; and
    enforcing received updated constraint profiles for specific IoT devices on the local area network.

16. The method of claim 1, further comprising:
using analytics to determine local area network level demographic trends or user level demographic trends concerning purchasing of IoT devices, based on monitored purchasing related activity.

17. The method of claim 1, wherein the network appliance on the local area network further comprises a router.

18. The method of claim 1, wherein constraining the behavior of the discovered IoT device further comprises:
determining a target user of the discovered IoT device; and
constraining the discovered IoT device to a virtual local area network separate from the local area network based on the target user of the discovered IoT device.

19. A system comprising:
a system memory;
an internet of things (IoT) network management system residing in the system memory, the IoT network management system being programmed to:
monitor purchasing related activity executed on at least one computing device on a local area network;
identify information concerning a purchase of at least one IoT device on at least one computing device on the local area network using the monitored purchasing related activity;
determine a level of confidence of an identity of at least one specific IoT device purchased on at least one computing device on the local area network, by assigning weight to identified information concerning the purchase of at least one IoT device;
discover an IoT device added to the local area network;
analyze the information concerning the purchase of at least one IoT device, including the level of confidence;
determine identifying information concerning the discovered IoT device, using the analyzed information concerning the purchase of at least one IoT device, including the level of confidence;
transmit identifying information concerning the discovered IoT device to a remote backend component, the information concerning the purchase of the discovered IoT device further comprising the level of confidence of the identity of the discovered IoT device;
receive a constraint profile matching the discovered IoT device from the remote backend component, the remote backend component configured to create the constraint profile using information concerning purchases of the discovered IoT device received from a plurality of other local area networks, the information concerning purchases of the discovered IoT device further comprising corresponding levels of confidence of the identity of the discovered IoT device; and
constrain a behavior of the discovered IoT device to perform authorized functionality by enforcing the received constraint profile on the local area network.

20. At least one non-transitory computer-readable storage medium for securing internet of things (IoT) devices on a local area network, the at least one non-transitory computer-readable storage medium storing computer-executable instructions that, when loaded into computer memory and executed by at least one processor of a network appliance, cause the network appliance to perform operations comprising:
monitoring purchasing related activity executed on at least one computing device on the local area network;
identifying information concerning a purchase of at least one IoT device on at least one computing device on the local area network, using the monitored purchasing related activity;
determining a level of confidence of an identity of at least one specific IoT device purchased on at least one computing device on the local area network, by assigning weight to identified information concerning the purchase of at least one IoT device;
discovering an IoT device added to the local area network;
analyzing the information concerning the purchase of at least one IoT device, including the level of confidence;
determining identifying information concerning the discovered IoT device, using the analyzed information concerning the purchase of at least one IoT device, including the level of confidence;
transmitting identifying information concerning the discovered IoT device to a remote backend component, the information concerning the purchase of the discovered IoT device further comprising the level of confidence of the identity of the discovered IoT device;
receiving a constraint profile matching the discovered IoT device from the remote backend component, the remote backend component configured to create the constraint profile using information concerning purchases of the discovered IoT device received from a plurality of other local area networks, the information concerning purchases of the discovered IoT device further comprising corresponding levels of confidence of the identity of the discovered IoT device; and
constraining a behavior of the discovered IoT device to perform authorized functionality by enforcing the received constraint profile on the local area network.

* * * * *